United States Patent Office

2,755,172
Patented July 17, 1956

2,755,172

SELECTIVE REPLACEMENT OF METAL SULFIDES

Patrick J. McGauley, Glen Cove, N. Y., Felix A. Schaufelberger, Elizabeth, N. J., and Edward S. Roberts, New York, N. Y., assignors to Chemical Construction Corporation, New York, N. Y., a corporation of Delaware No Drawing. Original application November 15, 1949, Serial No. 127,452, now Patent No. 2,662,009, dated December 8, 1953. Divided and this application September 11, 1953, Serial No. 379,746

6 Claims. (Cl. 23—134)

This invention relates to the concentration of non-ferrous metals as sulfides from an ore concentrate containing non-ferrous metal values, particularly copper, together with acid insoluble gangue and at least one diluent metal value such as iron.

With the increasing utilization, over the past fifty years, of non-ferrous metals, particularly copper, there has steadily grown a demand for improved procedures whereby such metals can be more efficiently recovered from their ores. Particularly throughout the latter half of this period, repeated attempts have been made to devise processes for carrying out this operation chemically.

Roughly, the overall problem may be broken down into two parts. First, the mineral values must be extracted from the ore by some successful leaching system. Second, pure metals must be economically and efficiently recovered from the solutions obtained in the leaching operations. Whether considered as part of the leaching problem, or as part of the metal-recovery problem, there is the additional difficulty, which must be overcome, in that the mixture of metals or their minerals or salts must be separated each from the other.

In the past, largely with respect to the treatment of copper minerals, a number of proposals for such chemical extraction procedures have been presented. Unfortunately, all these operations suffered from one or more serious defects. As a result, none have been capable of commercial development on a scale commensurate with the possibilities of a suitable process of this type.

When the wide variety of problems presented by the copper industry alone are considered, this failure is not particularly surprising. For example, it is desirable to be able to treat many varieties of copper minerals by the same process, including those of oxidized and sulfide copper minerals. When this problem is complicated by the presence of other minerals, which not only must be removed therefrom, but also recovered, the complexities of the problem and the previous failures to provide successful solutions thereto become even more readily appreciated.

Nevertheless, a demand remains in the industry for a process capable of easily and economically treating a minerals mixture. It must be adaptable to separate and to recover the copper and other metal values from the gangue and/or diluents. It is, therefore, a principal object of the present invention to provide such a process. It is with the combination of leaching and minerals-separation that the present invention is concerned. In general, it deals with the treatment of ores which are mixtures of metal-values minerals to obtain one or more enriched concentrates of metal sulfides. These may be either mixtures freed from gangue and diluent metals, or individual selected sulfides.

Still more specifically, leach solutions, preferably obtained by acid leaching of the minerals mixture, containing dissolved salts of the metal values, are treated by a replacement reaction. In the latter are employed an additional metal sulfide or metal sulfides and a reducing agent. The metal-values sulfides are thus precipitated in a mixture of all the sulfides whose solubility is less than that of the added metal sulfide. The mother liquor will contain, as dissolved salts, all the remaining metals-values, i. e., salts of those metals the sulfides of which are of equal or greater solubility than that of the added sulfide. In addition, it will contain an amount of dissolved acid salt equivalent to the added metal sulfide reacted in replacing the desired sulfides. The desired sulfides, as precipitated by the reaction, are collected and treated to reconvert the sulfides to solutions of soluble salts. The latter may then be treated further to separate selected sulfides.

Of the previously-proposed processes, perhaps the best is that in which copper is separately removed as equivalents of crystallized copper sulfate from liquors obtained by acid leaching of minerals mixtures containing iron and other metal minerals. In this previously proposed process an effective industrial method of separating soluble copper salts from iron and other metal salts, in an acid leach solution containing the copper and other metal sulfates, is disclosed. The process involves treatment of the copper-bearing leach solution by replacement with iron sulfides, usually that in the ore. When this operation is properly conducted, it results in the complete precipitation of copper from the solution as copper sulfides. It is accompanied by the simultaneous dissolution of an equivalent amount of iron sulfides which is converted to ferrous sulfate. The copper sulfides are collected by filtration and the filtrate is discarded. The collected copper sulfides are oxidized to copper sulfate in solution; and so much of the latter as can be crystallized as pure copper sulfate is separated out and collected. By recirculation, all copper is eventually thus recovered.

This device was found to be very useful as a method of discarding iron and acid-insoluble diluent metals from a leaching-reduction system without causing loss of copper. However, when the ore being treated contains other valuable metals, such as cobalt, nickel, zinc, manganese and moylbdenum, these metals are also dissolved during leaching but are not recovered. They remain in the leach solution and are removed from the system in the ferrous sulfate liquor. Since these metals are valuable and are often present in amounts sufficient to be profitably recovered, they cannot be discarded with the ferrous sulfate without economic loss. The problem of devising a suitable recovery system, which would also recover these additional non-ferrous metals, thus remained unsolved. Preferably, each metal should be recovered as a separate product, if possible.

In accordance with the patent application, now United States Letters Patent No. 2,662,009, a process is provided for the separation and recovery of these additional non-ferrous metals, as their sulfides, alternatively as a mixture with the copper sulfides fraction or as separated metal sulfides. This divisional application deals with the latter. In the parent case it was shown that the mixed sulfides can be produced from an ore concentrate containing non-ferrous metal values together with acid-insoluble gangue and at least one diluent metal value such as iron. The procedure comprises subjecting the ore concentrate to a leaching operation under oxidizing conditions in the presence of aqueous acid, usually sulfuric acid, whereby substantially all the metal values, including the diluent, are dissolved as soluble salts in aqueous acid solution, removing any residual undissolved acid-insoluble solids, and subjecting the resultant clarified solution in a primary replacement under acid conditions by simultaneous treatment with (a) a treating sulfide of a metal such as iron sulfide the solubility of which sulfide at the treatment acidity is greater than that of the sulfide of any other metal value to be recovered and (b) a reducing agent, continuing the treatment until reaction substantially ceases, and collecting the resultant concentrated precipitate of sulfides of non-ferrous metals. This divisional application deals with the modifications whereby the metals as sulfides are separately rather than jointly precipitated.

Several general considerations, applicable to the present invention, should be noted at this point. Where the relative solubility of a sulfide is discussed herein, it is taken as indicated by the solubility product "K," i. e., the product obtained by dividing the product of the metal ion concentration and the sulfide ion concentration by the concentration of the un-ionized sulfide in solution. For purposes of comparison, several values of the solubility product "K" for various metal sulfides, in water at 18° C., are listed in the following table:

Table

| Metal Sulfide | Solubility Product "K" |
| --- | --- |
| MnS | $1.4 \times 10^{-15}$ |
| FeS | $3.7 \times 10^{-19}$ |
| ZnS | $1.2 \times 10^{-23}$ |
| NiS | $1.4 \times 10^{-24}$ |
| CoS | $3.0 \times 10^{-26}$ |
| PbS | $3.4 \times 10^{-28}$ |
| CdS | $3.6 \times 10^{-29}$ |
| CuS | $8.5 \times 10^{-45}$ |
| $Cu_2S$ | $2.0 \times 10^{-47}$ |
| $Ag_2S$ | $1.6 \times 10^{-49}$ |

From the foregoing table, it will be readily seen that FeS is more soluble than any of the other sulfides listed, with the exception of that of MnS. This fact is utilized in the present invention in the following way. While MnS is more soluble than FeS, it is not present in most sulfides ores of non-ferrous metals in appreciable quantities, and economically, the content present therein may usually be discarded in the ferrous sulfate liquor without appreciable loss. Further, manganese sulfide per se is neither common nor cheap. It is, therefore, not a desirable sulfide for use in the replacement reaction of the present invention. Iron sulfides are both common and cheap. Therefore, naturally-occurring sulfides such as $FeS_2$, FeS and mixtures thereof make excellent sulfides to replace other sulfides from solution in the present process.

If sulfide minerals, containing available iron sulfides, are added to the hot pregnant leach liquor containing sulfates of such metals as copper, nickel, or zinc, whose sulfides are less soluble than FeS, iron goes into solution as ferrous sulfate. At the same time, replacement and precipitation of an equivalent amount of one of the other metals occurs. This metal is always found to be preferentially that which has the next most insoluble sulfide.

By way of further illustration, it may be assumed that an ore containing copper and iron sulfides is to be leached with acid-ferric sulfate solution, with oxidation. A pregnant leach liquor, containing copper and iron sulfates, is obtained. If this solution is then treated with additional amounts of the ore concentrate, similar reactions to the following would be expected to take place:

(1) $CuFeS_2 + H_2SO_4 = H_2S + FeSO_4 + CuS$ (2) $CuSO_4 + H_2S = H_2SO_4 + CuS$ (3) $2CuSO_4 + H_2S = 2H_2SO_4 + Cu_2S$ (4) $Fe_2(SO_4)_3 + H_2S = 2FeSO_4 + Sulfur + H_2SO_4$ Thus, when $CuFeS_2$ is added to a hot acid solution of copper sulfate, $H_2S$ is produced according to (1). The first of this $H_2S$ is used up according to (4). After all of the $Fe_2(SO_4)_3$ has been converted to $FeSO_4$, the additional $H_2S$ is used to precipitate copper according to (2) and (3). These or similar reactions will continue until all of the copper is precipitated from solution as CuS or $Cu_2S$. Further, if other metal salts, such as nickel, cobalt, zinc, lead, or cadmium and the like, the equivalent metal sulfides of which are more soluble than CuS, are also present in the solution, substantially none of their sulfides will be precipitated under equilibrium conditions, unless and until all the copper is replaced and precipitated as its sulfide. This device is used to separate and purify copper from all the remaining metals. Accordingly, as was noted, these metals are lost from the system in solution with the ferrous sulfate.

Although the present invention is not intended to be limited to a particular theory of operation, it is believed that the incomplete precipitation of sulfides other than copper is due to the fact that oxidation reactions, such as that of Equation 4 above, destroys the (S—) ions before their concentration becomes great enough to permit the solubility product for one of the other metal sulfides to exceed its solubility constant. For example, in the case of nickel sulfide, the sulfide ions are destroyed before the product of their concentration, multiplied by the concentration of the nickel ions, and the product divided by the concentration of the NiS ions in solution, becomes great enough to exceed the above-noted value, $1.4 \times 10^{-24}$. Above this value of this constant, NiS will precipitate as a solid. In the process of the present invention, precipitation of all metal sulfides less soluble than the replacing sulfides is caused, rather than prevented, as was previously done.

It is also a principal feature of the present invention that an added reducing agent is used, with the added metal sulfide, in the replacement reactions. Thus, an acid salt solution being treated with an added metal sulfide, such as iron sulfides, is simultaneously subjected to the action of a reducing agent. It is believed, although once again not intending to limit the invention to any particular theory of operation, that this tends to reverse the oxidation reactions, such as that of Equation 4 above, and thereby increases the sulfides ion concentration in solution. In this way, by suitably controlling additions, the replacement reactions may be controlled to completely precipitate sulfides of any, or all, of those metals the sulfates of which are in solution, but the sulfides of which are less soluble than the replacing metal sulfide, i. e., FeS, i. e., have a lower "K" value than does the latter.

An ore concentrate ordinarily forms the feed material for the process of the present invention. It may have been obtained by froth flotation, gravity separation, or any other conventional method, whereby a bulk of the gangue constituents is eliminated.

For purposes of illustrative discussion, it may be considered that the representative ore concentrate is one which contains iron, copper, nickel, cobalt, zinc, and manganese only. Other constituents, such as silver, lead, molybdenum and the like, will no doubt be present, at least in small amounts. However, the amounts thereof are either small enough to be discarded economically or their behavior and treatment will be shown by one of the illustrative metals. This will depend on whether, like manganese, the sulfides are more soluble than FeS or, like copper and zinc, the sulfides are less soluble. These facts being true, it simplifies the further discussion of the present invention to consider the problem as if these additional metals were not present. After the discussion has been developed, it is believed that treatment for any one of these particular sulfides, if desirable, will have been clearly indicated.

An ore concentrate of the above-noted illustrative nature is first sent to some type of leaching system. The invention is not particularly concerned with the arrangement of the leaching operation and apparatus. It is quite possible to adapt the overall process to any of the various acid, acid sulfate and ammoniacal leaching systems or procedures which are now well known.

However, it will be brought out that the replacement reaction of the present process is initiated, and usually is carried out, in an acid solution. For other than acid leaching, therefore, adjustment of the pH of the leaching solution must be carried out before the replacement reaction is carried out. The latter must be done on a solution of soluble salts, preferably the sulfates. Therefore, while sulfates, or some other equivalent salt, are readily formed in solution after leaching, regardless of the exact leach liquor used, acid sulfate leaching is usually the most desirable and will be generally taken as being illustrative in the following discussion.

Whatever the leach liquor used, it is added to the ore concentrate in the leaching system. This may be as acid leach liquor. Preferably, but not necessarily, air or oxygen or oxygen-enriched air is blown through the mass being leached. An acid sulfate leach liquor is also probably preferably, because it is adapted to the treatment of a greater variety of non-ferrous metal ores, including both sulfides and oxidized metal minerals.

Specific details of the leaching operation are not an essential feature of the process of the present invention. Leaching is carried out in some known manner, according to conventional practice. Usually, but not necessarily, it is carried out at elevated temperatures. An acid leaching with concomitant oxidation is highly exothermic. Due to the preferred use of air of oxygen, it is therefore preferably carried out under increased pressure. Conventional apparatus is usually available for the purpose.

The discharge from the leaching system proper comprises a slurry. The latter will contain undissolved solids, principally gangue, and a solution of salts of the mineral values. This slurry is filtered to remove the residue. The latter is principally gangue and an acid-insoluble gangue. If such metals as lead, whose sulfates are insoluble in the leaching solution, are also present in the ore concentrate, these will be removed with this residue. This residue, normally, is sent to waste. Various circulating systems, to insure against metal losses in the leaching steps, are conventional.

Although, as noted above, acid leaching is preferred, if a basic leaching system is to be used, the pregnant leach liquor, ordinarily, will be converted to the acid side before the replacement reaction. While a replacement reaction may be carried out in a basic circuit, such a procedure will, ordinarily, involve a considerable amount of additional apparatus, require additional reagents and very appreciably complicate filtration. Accordingly, replacement, as noted above, is preferably carried out in acid solution. Acidification for this or other reasons may be carried out, either before or after filtration.

Acidification, if necessary, may be accomplished by the direct addition of acid. Preferably, however, it should be done by using the basic pregnant leach liquor as part of the leach liquor in carrying out a supplemental oxidation leach, with additional amounts of sulfide ore. In this way, neutralizing acid may be formed in situ.

As a result of the above procedures the metal values are now present in the filtrate as a solution of soluble sulfates. This solution is sent to the primary replacement reaction. Here, as noted, it is treated with the metal sulfide and a reducing agent. Replacement may be carried out in any suitable vessel, equipped to carry out chemical reactions under pressure. For example, a solution of Cu, Co, Ni, Zn and Mn sulfates may be treated with added iron sulfide. This is preferably from some separate source as fairly concentrated FeS. However, if so desired an equivalent amount of the same ore concentrate fed to the leaching system may be used. In some cases, it may be desirable to use a mixture, partly ore concentrate and partly FeS from some such separate source, such as pyritic iron ore.

Whether used from a separate source of iron sulfides, or as part of the ore concentrate, or as a mixture, there must be available iron and available sulfur present. The total amount of added iron and sulfur should be at least slightly in excess of the theoretical equivalents required to precipitate sulfides of all the replaceable metals whose sulfates are in the pregnant leach liquor.

Ordinarily, the reaction will be carried out at elevated temperatures. Usually this will be in the range from about 275–750° F. While higher temperatures may be used, there is no particular advantage in so doing. While the lower temperature range places the least restrictions on the apparatus at the lower temperatures, considerably longer periods are required. If an oxidizing acid leach is used, the reaction is exothermic. Also, there is no trouble in obtaining the elevated temperature which is preferable in the replacement reaction. The sulfates solution, coming to the replacement reaction, is already hot. If additional heat is required for further temperature rise, it is readily available from the waste heat that is ordinarily removed by blowing steam from the oxidizing leaching system, to prevent the temperature of the latter from becoming too high.

For the same reason that elevated temperatures are preferred, apparatus equipped for agitation is also desirable. It is not essential to successful operation. However, in general, a replacement which can be carried in one and one-half to two hours at about 450° F. without violent agitation, can be carried out in about one-half hour, at the same temperature, if the pressure vessel is equipped for additional agitation of its contents.

Supplementing the action of the added solid sulfides is one of the critical features. For this purpose, as noted above, an additional reducing agent, preferably a gas, is used. Substantially any available reducing gas may be made to serve the purpose. Carbon monoxide, sulfur dioxide and the like, may be used, for example. Hydrogen is, perhaps, even better, as it is an excellent supplement to the hydrogen sulfide which is always liberated during the replacement reactions. Mixtures of carbon monoxide and hydrogen are found in various industrial gases, and are usually the most economical and the most readily utilized. Hydrocarbons, such as methane and ethane, may be used. However, their use alone is not too desirable, because, in some cases, they appear to form complex ions with some of the metals. Their presence, or the presence of sulfur-bearing gases, as part of an otherwise desirable and available gas mixture, does not appear to be harmful, in this respect.

The actual consumption of reducing agent is comparatively small. It is necessary only to maintain sufficient concentration to retard or reverse the tendency toward completion of oxidation reactions, such as that discussed above. For this reason, if desirable, or necessary, other and less economical agents may be used. For example, methyl and ethyl alcohol may be used for the purpose. Formic acid, oxalic acid, and the like, formaldehyde in its various commercial forms, and as its sulfoxylates, serve the purpose. Ordinarily, however, the use of a gas will be found more desirable, physically and economically.

Treatment with the added reducing gas, or other agent, and the ion or other metal sulfides is continued until substantially all of the precipitatable sulfides less soluble than the treating sulfide, i. e., the FeS, have been precipitated. The resultant slurry is filtered. The filtrate is ordinarily removed from the system as an iron discard. The iron, which will be principally present as ferrous sulfate, is the principal diluent metal.

In addition, this solution will contain sulfates of those metals whose sulfides are equally, or more, soluble than FeS. In the illustrative case, these metals are represented by the manganese. When they are present in the ore, the filtrate, therefore, will also include such varied metals as magnesium, aluminum, chromium and the like. These are minor constituents and are present in very small amounts. The current practice in treating these ores is to discard these minor fractions. There is no reason why this practice should not be continued in the operation of the present invention, unless an exceptional ore is found. In the latter case, the content of manganese or molybdenum or the like may be sufficiently high as to warrant special treatment.

The presscake from this filtration will contain any slight excess of iron sulfides over that required to precipitate the less soluble sulfides. In addition, it will contain sulfides of all the metals the sulfides of which are less soluble than FeS. In the illustrative case, these will be the sulfides of copper, nickel, cobalt and zinc. While this mixture of sulfides will contain some iron sulfide, as did the original ore concentrate, the proportions are entirely different. The small amount of iron remaining is readily removed.

In some cases, the leaching operation may not produce a solution in which the ratio of other metal sulfates to iron sulfate is sufficiently high for a replacement operation of optimum efficiency. If so, a part of the presscake from the filtration may be diverted and returned to the leaching system to supplement the valuable metals content of the ore concentrate being fed thereto. In this way, the solution coming from the leaching operation may be given any desirable ratio of desirable metals to iron. It is found that from about 5:1 to about 20:1, as ratios in solution, is a good general practice.

As will be seen from the foregoing discussion, replacement by means of the added metal sulfide and the reducing agent can be used to separate the metal values sulfides substantially completely from the diluent metals and gangue in the original ore. In some cases, it may be desirable to insure complete precipitation without having present these slight excesses of the metal having a sulfide of sufficient solubility to be used in the replacement. If such complete precipitation is carried out, the concentrate will necessarily contain the excess unreacted replacement sulfide. However, instead of having a metals values to diluent metals ratio of 1:1 or lower, as frequently found in an original ore concentrate mixture, the product sulfides mixture is now substantially free from iron.

When it is desirable to have this mixture completely free from replacement sulfide, this is accomplished by using two replacement reactions. In the first, slightly less than the amount of added more soluble metal sulfides than is stoichiometrically required to replace all the other less soluble sulfides is used. Precipitation will then cease when the iron or other replacement sulfide is used up, rather than when the less soluble sulfides of the replaced metals are completely precipitated. The so-replaced sulfides, free from replacing sulfide, which, in the illustrative case means free from iron, may then be collected in any desired manner, as by filtration.

The remaining solution is then subjected to complete precipitation with an excess of added metal sulfide, i. e., iron sulfide. This second, or supplemental, replacement produces a sulfides concentrate which is small in amounts and contains added metal sulfides as well as replaced metal sulfides. This concentrate is collected and is either recycled to the leaching operation, or added with the slurry coming into the primary replacement stage. The latter operation is, perhaps, simpler.

It might appear that, after stripping the sulfides with a deficiency of soluble metal sulfide, and removal of the desired sulfides concentrate, the residue could be returned directly to the replacement reaction which is designated as a primary replacement. This cannot be done, because, except in special circumstances, such a practice would build up an excess of dissolved iron sulfate, or its equivalent, in the replacement circuit.

It is, of course, much simpler, and will presumably be preferable, to precipitate all the mixed sulfides by using a slight excess of iron sulfide, or its equivalent. The resultant small amount of iron sulfide contaminant is readily removed later. This was noted above and will be explained more fully below.

A second principal operation of the present invention operates in the separation of the sulfides mixture concentrate into its component sulfides. Commercially, of course, any process which cannot accomplish this result is not particularly useful. In the past, little helpful information has been available as to processes suitable for the purpose. In general, they were largely confined to two fields, fractional crystallization and selective leaching.

A substantially complete solution of all the recoverable metal values in an ore is almost a requisite for economical operation. Unfortunately, such a mixture of constituents, as is found in most sulfide flotation concentrates, is completely dissolved only by means of acid or acid-ferric sulfate leaching, generally with oxidation as an added requirement. This is the operation preferred in the present invention. Pregnant leach liquor so-obtained can, and often will, contain, for example, iron, copper, cobalt, nickel, manganese, zinc, molybdenum, silver, arsenic, tin, bismuth, calcium, magnesium, selenium, sodium chloride and other minor items.

Discounting the iron, where in copper recovery is usually a diluent, metal values of copper, nickel, cobalt, and possibly silver, zinc, and lead, are the only constituents likely to be present in amounts which warrant an attempt at their recovery by the present process. As noted above, the remainder is usually present in small amounts only and, in general, may be discarded. If, occasionally, one or more of these constituents is present in industrially-recoverable amounts, a special circuit can be set up for it. Otherwise, in the practice of the present invention, the custom used in the present industry of discarding these minor constituents is generally followed.

Reverting to the pregnant leach liquors, the illustrative valuable metal constituents are in solution as soluble salts, generally as sulfates. Unquestionably, the solubilities of these salts is such that little, if any, benefit can be obtained by attempting to separate them by fractional crystallization. Particularly is this true in the ratios in which they are usually present in the leach liquors. Industrially, very little has been accomplished in this field, principally because of the obvious limitations.

The other alternative, selective leaching, can be successfully carried out under certain conditions. Using very carefully controlled leaching on highly suitable ores, those ores containing only metals whose sulfides differ widely in solubility and in amount, selective leaching can be employed. Again, unfortunately, such suitable ores are not common. Further, the careful leaching conditions are difficult to establish and to maintain. Even more unsatisfactory, complete leaching of all the valuble metal substituents is seldom, if ever, possible.

It is, therefore, no small feature of the present invention that it may be readily employed to separate such a sulfides mixture as is produced by the processes described above into its components. This is done by properly controlled replacement.

The mixed slurry containing unreacted iron sulfide is subjected to an acid oxidation. For this purpose, the slurry is combined with a suitable acid, preferably sulfuric acid, since this sulfate is a desirable salt, and subjected to oxidation by blowing therethrough air, oxygen, or oxygen-enriched air. The reaction is carried out, preferably, in the manner used in the conventional oxidizing acid leaching, discussed above. It is carried out under pressure at an elevated temperature of about 250–750° F. Since the reaction is exothermic, there is no difficulty in obtaining either the pressure or the temperature. Usually, it may be necessary to bleed steam from the operation, in order to prevent excessive temperature and pressure loads upon the apparatus. The lowest practical temperatures and pressures are preferable, as they decrease corrosion problems in the apparatus.

The resultant solution of soluble sulfates is also filtered to remove any insoluble residue. Ordinarily, this will only result in the removal of discardable waste material. In some cases, however, the presscake may contain a small amount of the material which it is desirable to recover. Usually, this is due to incomplete oxidation in the preceding step. In such cases, this residue is readily passed back to the oxidation step, or to the leaching system.

The resultant filtrate is subjected to the first of the actual sulfide separating operations. It is accomplished, preferably at about 250–450° F., by treating the filtrate in a suitable vessel with some metal sulfide which is more soluble than copper sulfide. Again, for illustrative purposes, this is considered to be iron sulfide. In the actual operation, it will be iron sulfide per se, in most cases, because of the large amounts readily available from pyritic iron ores. It may be ore concentrate, if necessary or desirable. An amount stoichiometrically equivalent to the available copper in the filtrate is added thereto. Replacement continues until precipitation of the copper sulfide is substantially complete.

Solubilities of various metal sulfides is markedly affected by the acidity of the solution in which it is attempted to dissolve them. In the present case, it is desirable to completely precipitate copper sulfide, while maintaining in solution all the other metal sulfides. The resultant iron sulfate should also be retained. At a pH above about 2.7–3.0, other metal sulfides, such as cobalt and/or nickel sulfides, tend to precipitate with the copper, and a pH of about 2.7 is, therefore, about the maximum desirable limit and 3.0 is about the limit permissible for suitable operation. On the other extreme, too high a concentration of acid makes it quite difficult to precipitate copper sulfide. About 15% acid content in solution is approximately the highest acidity which is desirable in this circuit.

Since it is undesirable to precipitate additional sulfides in this particular step; in fact, to the contrary, it may be desirable, and it is quite feasible, to add small amounts of air, oxygen, or ferric sulfate to prevent other metal sulfides from being precipitated with the copper; it is apparent, then, that in this one step, the added reducing agent is not necessary. However, added metal sulfide is used in usually substantially sufficient amount to insure, in and of itself, replacement and precipitation of all the copper as copper sulfide. This is collected as product.

The filtrate, remaining from the removal of the copper sulfide, is passed to the second of the sulfides separation operations. As shown in the table of the solubility products, above, the next least soluble sulfide, in the illustrative case, is that of cobalt. Accordingly, it is the next to be removed. Suitable acid conditions for its complete precipitation are in the pH range of about 3–5. Under favorable conditions, this range may be increased to 2–5 or 2–5.5.

Reduction in the acid content of the solution to the requisite pH may be carried out in any desired manner. Probably the most simple method is the addition of aqueous ammonia, or an equivalent base, which will not cause precipitation of insoluble metal salts. However, it is usually much more economical to utilize lime, or some similar alkaline-earth metal oxide or hydroxide. In the latter cases, however, the resultant insoluble alkaline-earth metal sulfate must be removed to prevent contamination of subsequently-precipitated metal sulfides. At the end of the copper precipitating period, the copper sulfide is filtered out, lime is added to the filtrate, and the resultant calcium sulfate precipitate is filtered out. The calcium sulfate may be discarded.

Iron sulfides, as the illustrative added sulfide, are then added in equivalents to the cobalt sulfate, the equivalent sulfide of which is to be precipitated. Replacement is carried out until precipitation substantially ceases. Again, the slurry is filtered and the cobalt sulfide is collected.

In a similar manner, subsequent replacement operations are carried out to successfully precipitate sulfides of the remaining dissolved metal salts, i. e., those of nickel and zinc, in the illustrative case. The most favorable pH conditions for replacement of the nickel sulfide is believed to be about 5.0–6.2. Zinc sulfide is most readily precipitated at a pH of from about 6.2 to approximate neutrality. Care should be taken not to pass the circuit appreciably to the basic side at this stage. If such precaution is not taken, it will be found that iron sulfide is not soluble. The replacement, using iron sulfide, therefore, is inoperative.

Because definite pH limits to be used in the present process have been specified, does not necessarily mean that a sulfide replacement for any one metal cannot be carried out at other pH ranges, particularly when other metals are not present. The ranges indicated here are those which have been found suitable for the separation operations. Also, it should be noted that the reaction is being carried out under reducing conditions. Therefore, where the metal sulfide or sulfides being precipitated are of a metal or metals commonly exhibiting differing valences, all or a part of the precipitated sulfides may be of the metal or metals in their reduced form.

The final filtrate, which may contain some small amounts of metal values, usually is of insufficient economic value to warrant further treatment. It is, ordinarily, sent to discard.

Again, it should be noted that, as discussed above, the illustrative case is limited to certain metals. Others may possibly be present in sufficient amount to be economically recoverable. In that case, a separate circuit, therefore, should be set up, utilizing the principles disclosed with respect to the illustrative metals.

Purity of the precipitated sulfide depended upon using stoichiometric quantities of iron sulfide. As a practical matter, this is somewhat difficult to control. A slight deficiency in the amount of iron sulfide to be used to precipitate a different, particular sulfide, such as that of copper, has two effects. Copper will be precipitated as pure copper sulfide; unfortunately, however, not all the copper is precipitated, and this residue is passed into the next stage and becomes a contaminant of the sulfide to be precipitated therein. Similarly, in each succeeding step, there is danger of carrying over unprecipitated, potentially precipitatable, metal, which will become a contaminant in attempting to recover the next sulfide to be separated.

On the other hand, the use of a slight excess of added sulfide over the theoretical equivalents required has an entirely different, but equally undesirable, effect. The excess metal sulfide, not being reacted, remains as a solid in the slurry, and reports as a contaminant in the same precipitation step. Either result is to be avoided, if possible.

By slight modification of the circuit, this difficulty is readily overcome. A mixed sulfates solution serves as starting material. This solution is then subjected to the first of a plurality of copper sulfide precipitations. In the first, a deficiency of iron is used. As a result, incomplete precipitation of copper sulfide is obtained. However, the precipitated sulfide so obtained comprises substantially all the copper, and it is substantially pure, i. e., substantially free from other metal sulfides. This precipitate is filtered out and recovered as copper sulfide product.

The filtrate, containing the remaining metal values, and the small amount of unprecipitated copper, is then given a second treatment to precipitate the copper. In this second treatment, a slight excess of iron sulfide is used. This precipitates all the residual copper sulfide as copper sulfide which is contaminated with the unreacted excess iron sulfide. It does not, however, constitute loss, because, as shown, the solids can be recovered by filtration. The collected mixed sulfides, small in amount, are recirculated as part of the solids fed to the first copper sulfide precipitation.

As a result, the second filtrate is then reduced to a pH suitable for the precipitation of the next most insoluble sulfide. Aqueous ammonia is preferably used for this purpose, although, as discussed above, as a practical matter, it will usually be cheaper to use lime, burned dolemite, or the like, and a second filter. The pH-increased solution is treated to obtain a first cobalt sulfide precipitate, using a slight deficiency of replacement sulfide over the theoretical requirements. At the same time, as in the foregoing discussion, a reducing gas, or equivalent agent, is used. The resultant precipitate of pure cobalt sulfide is collected by filtration.

The filtrate, containing a small amount of cobalt, is given a second cobalt replacement; and, as in the case of copper, the remaining sulfide is precipitated and collected in a precipitate slightly contaminated with ferrous sulfide. As was the case with the second copper sulfide precipitate, this second cobalt precipitate is returned as part of the solids fed to the first cobalt sulfide replacement. In this way, as was the case of the copper, all the desired metal sulfides eventually report as a sulfide free from both diluent metals sulfides, sulfides of the metal values having a lower or a higher solubility than the desired sulfide, and from soluble salts.

The succeeding steps can be carried out in the same way, modifying the nickel sulfide replacement into two stages, and the zinc sulfide replacement into two stages. The final filtrate, after the zinc sulfide replacement, is again discarded.

Sulfides other than iron, together with reducing gas, may be used to replace those metals whose sulfides are less soluble than that of the replacement metal. Illustrative examples may be found in the following representative equations:

(5) $NiS + CuSO_4 = NiSO_4 + CuS$
(6) $ZnS + CuSO_4 = ZnSO_4 + CuS$
(7) $ZnS + CdSO_4 = ZnSO_4 + CdS$

Reactions such as those illustrated above may be employed to perform the replacement and separation of separate sulfide products from sulfate solutions, in accordance with the present invention. This may be done in one of several ways. The replacement, or replacements, may be carried out on solutions obtained in other processes, or they may be carried out on solutions made expressly for the purpose. Preparation of the latter has been fully illustrated above.

It should also be noted that, in the operations discussed above as illustrative, stoichiometric quantities of iron sulfide were reacted with the sulfates solution. Only the metal with the most insoluble metal sulfide is precipitated and filtered off. The acidic conditions were maintained at the most favorable range for the purpose. The solutions were then treated successively with additional quantities of iron sulfide and additional quantities of reducing agent, thereby successively separate metal sulfides were replaced. This is repeated until the desired separations are accomplished.

In a modified procedure, the metal sulfides mixture, instead of being dissolved, is divided into two portions. Only one part is oxidized to convert the metal sulfides into dissolved soluble salts. The remaining portion is filtered and the presscake or residue is discarded.

Rather than using iron sulfide to replace the valuable metal constituents, as mixed sulfides, the untreated portion of the sulfides mixture is used to treat the filtrate as the replacing metal sulfide. The filtrate, containing copper, cobalt, nickel, and zinc, is sent to the first copper replacement. Therein, a mixed metal sulfides portion, taken out as noted above, is taken of sufficient weight to have a cobalt plus nickel plus zinc content slightly deficient to the equivalents of available, replaceable copper in the filtrate. Replacement is carried out with these mixed sulfides. The resultant slurry is filtered and the presscake from the filtration step is the substantially pure copper sulfide product.

Filtrate is then treated with enough more of the divided-up sulfides to provide a cobalt plus nickel plus zinc total slightly in excess of the remaining copper. In this reaction, the second copper sulfide replacement, the remaining available copper is precipitated. There will be precipitated therewith, the slight excess of mixed sulfides which are unreacted. Slurry is filtered, and the mixed sulfides are returned as part of the feed to the first copper replacement. In this way, eventually all the copper reports in the pure copper sulfide fraction, and all the other metals continue into the subsequent treatments.

The filtrate, after the removal of copper sulfide and mixed sulfides, is divided into two portions. Each portion is treated in a manner analogous to that used in the copper precipitation. One portion is used to obtain the replacement sulfides to be used in the next step. The remainder is used as the solution, from which the next most insoluble sulfide is replaced. The next step is the removal of cobalt.

The first portion of the divided filtrate is sent to a separate replacement operation. Here, it is treated with additional quantities of iron sulfide and a reducing gas, and enough is used to convert the total cobalt, nickel, and zinc in solution to insoluble sulfides. Iron sulfide, for example, is taken as illustrative, because it is usually the most readily-available cheap sulfide for the purpose. Any other available sulfide may be used. It must, however, be able to replace less soluble, but desirable, metal sulfides.

In general, it is best to use a very slight deficiency of the iron sulfide. This is done to insure freedom from excess iron sulfide in the replaced precipitate. If so desired, an arrangement may be used to prevent loss. Otherwise, the minor amount of unprecipitated cobalt, nickel, and zinc, may be discarded with the iron sulfate. The resultant precipitate of cobalt, nickel, and zinc is collected by filtration. Being free of both iron and copper, it is used as a replacement sulfide in treating the other portion of the filtrate to precipitate the cobalt.

The amount of sulfides mixture used for this purpose should have a nickel plus zinc content at least equivalent to the cobalt in solution. The solution is reduced in pH acidity to the approximate value, as was discussed above. As was also noted above, this may be done most economically by using lime, or other alkaline-earth oxide or hydroxide and an extra filter. It is desirable to use the reducing agent at this stage. The resultant slurry so obtained is filtered. Due to the use of a slight deficiency of replacement sulfide, a substantially pure cobalt sulfide product is obtained. Again, the filtrate is treated with a slight excess of the mixed nickel and zinc sulfides. The resultant precipitation of cobalt sulfides, plus excess sulfides, as was the second copper precipitate, is recycled to the first cobalt sulfide replacement.

The filtrate, which will then be cobalt and copper free, is passed to succeeding treatments. In each succeeding stage, the same general procedure is followed. The filtrate is divided into two portions. One is treated with an extraneous sulfide, such as that of iron, to obtain precipitating sulfides; and the remaining solution is treated to obtain the product sulfide. It is believed that these successive treatments are apparent from the foregoing discussion. There should be sufficient zinc available in this way to precipitate the nickel. Since the solution, after removal of the nickel, will contain only zinc, and zinc cannot be readily precipitated with zinc, some additional sulfide must be used for the removal and collection of the latter. Again we prefer the iron sulfide. However, it is not necessary that it be used. Especially at this stage, the solution is approaching neutrality. There is no reason why other sulfides, such as sodium sulfide, could not be used to replace the zinc sulfide.

As was noted above, replacement can be carried out in basic solution, if so desired. In such a case is sodium sulfide, potassium sulfide, or the like, which can be used as the replacement metal. By such a procedure, for example, it is possible to precipitate manganese sulfide from the ferrous sulfate liquor obtained in the earlier stages of the process. It is believed that, from the discussion of the principles of this case, there will be no difficulty in setting up a circuit for this purpose, if so desired. Such a circuit, for example, is highly convenient if it is necessary to recover a small amount of gold from the system. The gold sulfide is most readily precipitated from basic solution.

We claim:

1. In a process of separating therefrom as its sulfide at least one non-ferrous metal content of an aqueous solution containing a plurality of non-ferrous metal sulfates, the composition of which solution precludes effective separation by fractional crystallization, the improvement which comprises the steps of: treating said solution under acidic conditions in the presence of free acid with about a stoichiometric equivalent at least one solid metal sulfide the solubility of which is greater than the least soluble sulfide of any non-ferrous metal the sulfate of which is dissolved in said solution and with a reducing agent in sufficient amount to insure substantially no oxidation of sulfide ions to elemental sulfur; continuing the treatment at from about 250°–450° F., until precipitation of said metal having said least soluble metal sulfide substantially ceases; and removing resultant replaced sulfide precipitated by said treatment.

2. The process according to claim 1 in which the sulfide to be precipitated is that of copper and treatment is carried out at a free acid content range from that at about pH 3 to that at about 15% free acid.

3. In a process of separating therefrom as its sulfide at least one non-ferrous metal content of a solution containing a plurality of non-ferrous metal sulfates, the composition of which solution precludes effective separation by fractional crystallization, the improvement which comprises the steps of: treating said solution under acidic conditions in the presence of free acid with about a stoichiometric equivalent at least one solid metal sulfide the solubility of which is greater than the least soluble sulfide of any non-ferrous metal the sulfate of which is dissolved in said solution; continuing the treatment at from about 250°–450° F., until precipitation of said metal having said least soluble metal sulfide substantially ceases; followed by treating residual filtrate in at least one successive but separate stage, in each stage treatment being with an added increment of solid metal sulfides the solubility of which is greater than that of the least soluble sulfide of any of the non-ferrous metals the sulfate of which remains in solution and with a reducing agent in sufficient amount to insure substantially no oxidation of sulfide ions to elemental sulfur, in each stage, the free-acid content of the solution, being adjusted to and maintained within the range at which the metal sulfide would be precipitated, is substantially insoluble and precipitation of sulfides of the residual dissolved metals is minimized, whereby the non-ferrous metals in solution as sulfates are successively precipitated as their sulfides in substantially pure form, the precipitated sulfide being removed between each stage.

4. The process according to claim 3 in which the sulfide to be precipitated is that of cobalt and treatment is carried out at a free-acid content of from that at about pH 2 to that at about pH 5.5.

5. The process according to claim 3 in which the sulfide to be precipitated is that of nickel and treatment is carried out at a free-acid content of from that at about pH 5 to that at about pH 6.2.

6. The process according to claim 3 in which the sulfide to be precipitated is that of zinc and treatment is carried out at a free-acid content of from that at about pH 6.2 to that at about pH 7.

References Cited in the file of this patent

UNITED STATES PATENTS

| | | |
|---|---|---|
| 1,193,734 | Sulman et al. | Aug. 8, 1916 |
| 1,333,688 | Sulman et al. | Mar. 16, 1920 |
| 1,869,259 | Hughes et al. | July 26, 1932 |
| 2,424,866 | Udy | July 29, 1947 |